(12) United States Patent
Korge-Hårajuvet

(10) Patent No.: US 12,319,507 B2
(45) Date of Patent: Jun. 3, 2025

(54) SYSTEM AND METHOD FOR LIGHT COMMUNICATION IN A STORAGE SYSTEM

(71) Applicant: Autostore Technology AS, Nedre Vats (NO)

(72) Inventor: Geir Korge-Hårajuvet, Vikedal (NO)

(73) Assignee: AutoStore Technology AS, Nedre Vats (NO)

( * ) Notice: Subject to any disclaimer, the term of this patent is extended or adjusted under 35 U.S.C. 154(b) by 711 days.

(21) Appl. No.: 17/597,173

(22) PCT Filed: Jun. 25, 2020

(86) PCT No.: PCT/EP2020/067924
§ 371 (c)(1),
(2) Date: Dec. 28, 2021

(87) PCT Pub. No.: WO2020/260516
PCT Pub. Date: Dec. 30, 2020

(65) Prior Publication Data
US 2022/0306386 A1     Sep. 29, 2022

(30) Foreign Application Priority Data
Jun. 28, 2019 (NO) .................................. 20190813

(51) Int. Cl.
*B65G 1/137*     (2006.01)
*B65G 1/04*     (2006.01)
(Continued)

(52) U.S. Cl.
CPC ......... *B65G 1/1375* (2013.01); *B65G 1/0492* (2013.01); *F16P 3/08* (2013.01);
(Continued)

(58) Field of Classification Search
CPC .. B65G 1/1375; B65G 1/0492; B65G 1/0464; B65G 2207/40; B65G 1/04;
(Continued)

(56) References Cited

U.S. PATENT DOCUMENTS

| | | | |
|---|---|---|---|
| 5,002,449 A | 3/1991 | Kita et al. | |
| 11,770,846 B2 * | 9/2023 | Stuhaug | H04W 40/244 370/329 |

(Continued)

FOREIGN PATENT DOCUMENTS

| | | |
|---|---|---|
| CN | 106660703 A | 5/2017 |
| CN | 107531412 A | 1/2018 |

(Continued)

OTHER PUBLICATIONS

WO2020259883 description from espacenet (Year: 2020).*
(Continued)

*Primary Examiner* — Jacob S. Scott
*Assistant Examiner* — Erin Morris
(74) *Attorney, Agent, or Firm* — Baker Botts L.L.P.

(57) ABSTRACT

An automated storage system includes a three-dimensional storage grid for storing storage containers, at least one container handling vehicle operating on, around or under the storage grid, and a central communication system with a system transmitter and a system receiver for controlling and communicating with the at least one container handling vehicle for handling storage containers in the storage grid. At least one container handling vehicle includes a vehicle communication system with a vehicle transmitter and a vehicle receiver for communication with the central communication system. The system and vehicle transmitters and receivers are configured to use light for wireless communication. The system transmitter and the system receiver are located in the automated storage system on, around, or under (Continued)

the storage grid transmitting the same communication from all the transmitters of the central communication system.

10 Claims, 3 Drawing Sheets

(51) Int. Cl.
*F16P 3/08* (2006.01)
*H04B 10/116* (2013.01)

(52) U.S. Cl.
CPC .......... *H04B 10/116* (2013.01); *B65G 1/0464* (2013.01); *B65G 2207/40* (2013.01)

(58) Field of Classification Search
CPC ... B65G 2201/0235; B65G 1/065; F16P 3/08; H04B 10/116; H04B 10/114; H04B 10/1149; H04B 10/00; G05D 1/0297; H04W 72/12; H04W 72/20
See application file for complete search history.

(56) References Cited

U.S. PATENT DOCUMENTS

| | | | |
|---|---|---|---|
| 2016/0016732 | A1 | 1/2016 | Koide et al. |
| 2016/0318415 | A1 | 11/2016 | Salasoo |
| 2018/0356838 | A1* | 12/2018 | Schmidt .................. H04Q 9/00 |

FOREIGN PATENT DOCUMENTS

| | | | | |
|---|---|---|---|---|
| CN | 207612261 U | | 7/2018 | |
| CN | 109689545 A | | 4/2019 | |
| CN | 106064734 A | | 10/2019 | |
| GB | 2563281 A | * | 12/2018 | ......... H04B 10/1143 |
| JP | S60190041 A | | 9/1985 | |
| JP | H11205231 A | | 7/1999 | |
| JP | 2004245587 A | | 9/2004 | |
| JP | 2018052644 A | | 4/2018 | |
| NO | 317366 B1 | | 10/2004 | |
| WO | 2014/090684 A1 | | 6/2014 | |
| WO | 2015140216 A1 | | 9/2015 | |
| WO | 2015/193278 A1 | | 12/2015 | |
| WO | 2018002143 A1 | | 1/2018 | |
| WO | WO-2018022468 A1 | * | 2/2018 | .......... G05D 1/0088 |
| WO | 2018082971 A1 | | 5/2018 | |
| WO | 2018082972 A1 | | 5/2018 | |
| WO | WO-2018105954 A1 | * | 6/2018 | ............... G05D 1/00 |
| WO | 2018141876 A1 | | 8/2018 | |
| WO | WO-2020259883 A1 | * | 12/2020 | ............... B65G 1/04 |

OTHER PUBLICATIONS

International Search Report issued in International Application No. PCT/EP2020/067924, mailed Sep. 3, 2020 (5 pages).
Written Opinion issued in International Application No. PCT/EP2020/067924; Dated Sep. 3, 2020 (9 pages).
International Preliminary Report on Patentability issued in International Application No. PCT/EP2020/067924; mailed Sep. 16, 2021 (20 pages).
Search Report issued in Norwegian Application No. 20190813; Dated Dec. 19, 2019 (2 pages).
Xu Quan, First Office Action for Chinese Patent Application No. 2020800472665, dated Apr. 9, 2024, 14 pages, pub. by SIPO, Beijing, China.
Takako Ohtsuka, Notice of Reasons for Rejection for Japanese Patent Application No. 2021-576942, dated May 22, 2024, 9 pages, pub.by JPO.
Anonymous, "Notice of Preliminary Rejection" for Korean Patent Application No. KR1020227002892, dated Aug. 13, 2024, 7 pages, pub. by the Korean Intellectual Property Office.
Takako Ohtsuka, Decision for Refusal for Japanese Patent Application No. 2021-576942, dated Dec. 27, 2024, 9 pages, pub. by the JPO.
Xu Quan, First Office Action for Chinese Patent Application No. 2020800472665, dated Nov. 30, 2024, 10 pages, pub. by SIPO, Beijing, China.

* cited by examiner

SYSTEM AND METHOD FOR LIGHT COMMUNICATION IN A STORAGE SYSTEM

TECHNICAL FIELD

The present invention regards a system and method for wireless communication between a central controller of a storage system and container handling vehicles, and more particularly a system and method for wireless communication between a central controller of a storage system and at least one container handling vehicle using light as a medium of communication.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises several upright members 102 and several horizontal members 103 which are supported by the upright members 102. The members 102, 103 may typically be made of metal, e.g. extruded aluminium profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201, 301 are operated to raise storage containers 106 from, and lower storage containers 106 into, the storage columns 105, and to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. Each set of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

In the X and Y directions, neighbouring grid cells are arranged in contact with each other such that there is no space there-between.

In a storage grid 104, most of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting devices (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers 106 prior to lifting the target storage container 106 from the storage column 105. This step, which is sometimes referred to as "digging" within the art, may be performed with the same container handling vehicle that is subsequently used for transporting the target storage container 106 to the drop-off port 119, or with one or a plurality of other cooperating container handling vehicles. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers 106 positioned at or above the target position within the storage column stack 107 have been removed, the container handling vehicle 201, 301 positions the storage container 106 at the desired position. The removed storage containers 106 may then be lowered back into the storage column 105 or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system which typically is computerized and which typically comprises a database for keeping track of the storage containers 106.

WO 2018002143 A1 describes a system that is covered by the ingress of the independent claims of the present invention.

In the prior art system shown in FIG. 1 the central communication system uses Wi-Fi as a communication platform within the entire storage system. A drawback with using Wi-Fi for communication is that radio communication uses the same frequency range as other Wi-Fi systems, Bluetooth, microwave-ovens etc. and this may be a challenge with available bandwidth. An additional problem is that Wi-Fi signals may be received from outside the area where it is installed and is hence potentially a security risk. It can even be a problem that Wi-Fi cannot be installed in some places due to too much interference.

It is therefore an object of the present invention to solve the problems mentioned above associated with using radio waves as a means for communication between components of the storage system.

SUMMARY OF THE INVENTION

The present invention is set forth and characterized in the independent claims, while the dependent claims describe other characteristics of the invention.

A preferred embodiment of the present invention is defined by an automated storage system comprising a three-dimensional storage grid for storing storage containers, at least one container handling vehicle operating on, around or under the storage grid, and a central communication system with a system transmitter and a system receiver for controlling and communicating with the at least one container handling vehicle for handling storage containers in the storage grid wherein said at least one container handling vehicle comprises a vehicle communication system with a vehicle transmitter and a vehicle receiver for communication with the central communication system, wherein the system and vehicle transmitters and receivers are configured to use light for wireless communication, and wherein the system transmitter and the system receiver are located in the automated storage system on, around or under the storage grid.

Further, the vehicle transmitter and vehicle receiver of the vehicle communication system are located on a top surface of the container handling vehicle, and the vehicle communication system comprises more than one vehicle transmitter and more than one vehicle receiver.

Alternatively, the at least one vehicle transmitter and at least one vehicle receiver can be located on each side of the container handling vehicle.

The transmitter and receiver of the vehicle communication system is configured to communicate with other container handling vehicles with at least one vehicle communication system with a transmitter and receiver using a local communication system.

The vehicle transmitter and vehicle receiver of the vehicle communication system are configured to communicate instructions to open or close a barrier.

The vehicle transmitters and vehicle receivers are located on the vehicle for covering all directions above and around the container handling vehicle.

The automated storage system comprises more than one system transmitter and more than one system receiver, wherein the central communication system is configured to transmit the same communication from all the transmitters. The light used for communication is Visible Light Communication (VLC), Li-Fi, Irda, Optical Wireless Communication (OWC) or Reasonable Optical Near Joint Access (RONJA).

A preferred embodiment of the present invention is further defined by a method for controlling a container handling vehicle of an automated storage system, wherein the automated storage system comprises a three-dimensional grid for storing storage containers, at least one container handling vehicle operating on, around or under the storage grid, and a central communication system with a system transmitter and a system receiver for controlling and communicating with the at least one container handling vehicle, wherein said container handling vehicle comprises a vehicle communication system with a vehicle transmitter and a vehicle receiver, wherein the method comprises: transmitting wireless communication signals between the central communication system and the vehicle communication system of the container handling vehicle using light; and controlling operations of the container handling vehicle on, around or under the storage grid based on at least the wireless communication signals.

The transmitter and receiver of the vehicle communication system to other container handling vehicles with at least one vehicle communication system with a transmitter and receiver, using a local communication system.

Transmitting the same communication from all the transmitters of the central communication system if the automated storage system comprises more than one system transmitter and more than one system receiver.

It is therefore an object of the present invention to overcome these problems by introducing light communication. By using light communication, like Li-Fi, a potential hacker needs to be inside the same room as the container handling vehicles to hack the communication between the container handling vehicles and the system.

Further, by using light communication, e.g. Li-Fi there is a benefit of having the possibility to communicating vast amounts of data very quickly.

Using light as a medium of communication like e.g. Li-Fi the transmitter and the receiver must be within line of sight of each other. A solution is to place a multitude of transmitters and receivers within the housing of the storage facility spaced apart with regular intervals and on strategic places that cover a large area. The communication between the central communication system and the container handling vehicles can be in the form of the communication system transmitting the message from all the transmitters at the same time.

There can also be several transmitters and receivers placed on different sides of the container handling vehicles. There can be one transmitter and receiver (e.g. on top) that communicates with the central computer system and transmitters and receivers on each side that communicates with other container handling vehicles.

By using Li-Fi or other solutions it opens the possibility to communicate a lot more information both ways in the system which is a benefit to keep track of all the container handling vehicles and their status regarding charge and reduction in latency and more frequent updates. This reduces the time it takes to stop a system for a system stand still.

BRIEF DESCRIPTION OF THE DRAWINGS

The following drawings are appended to facilitate the understanding of the invention. The drawings show embodiments of the invention, which will now be described by way of example only, where.

DETAILED DESCRIPTION

Figure 1:
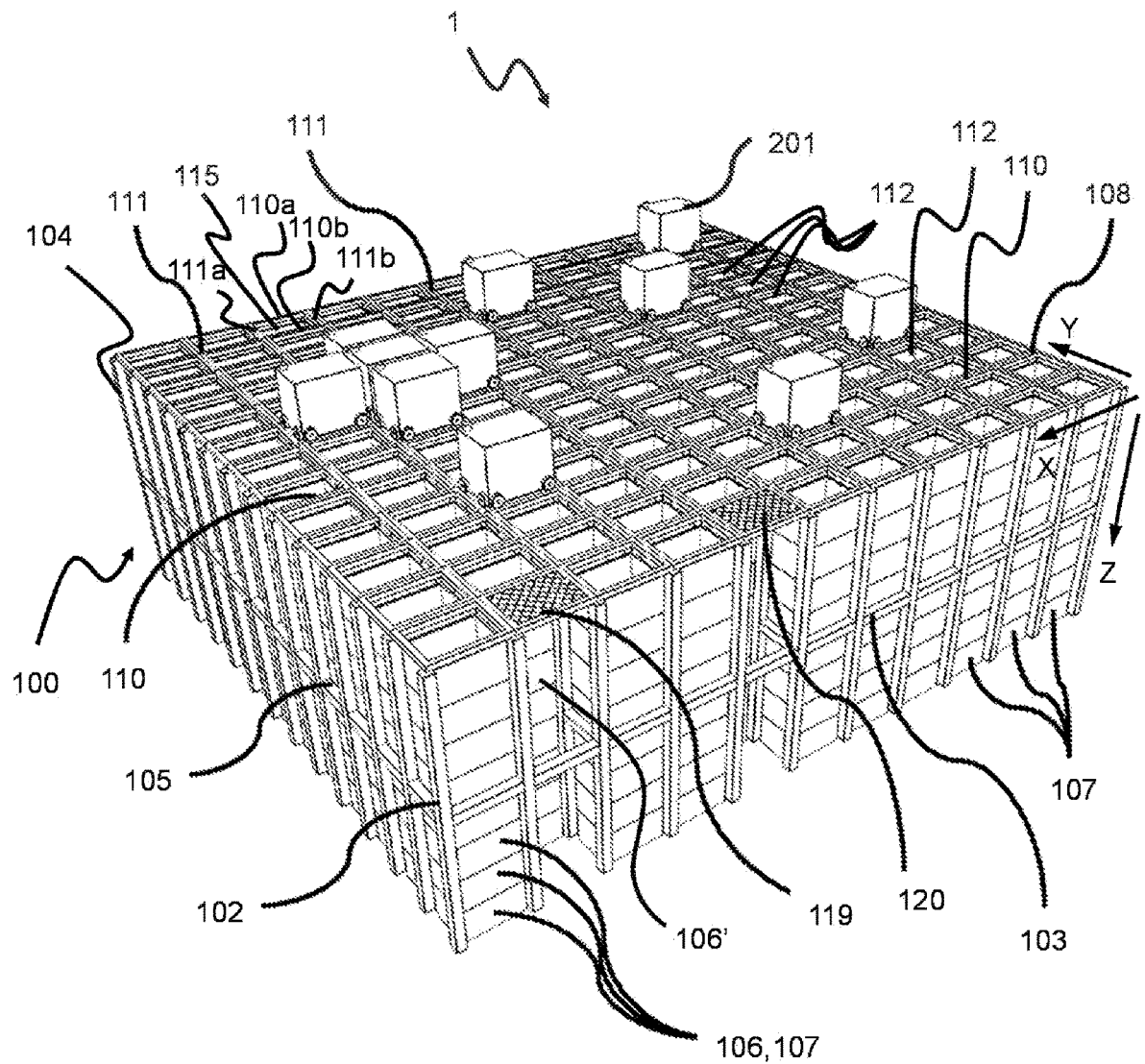
FIG. 1 is a perspective view of a prior art storage grid 104 with container handling vehicles running on top.

In the following, the invention will be discussed in more detail with reference to the appended drawings. It should be understood, however, that the drawings are not intended to limit the invention to the subject-matter depicted.

A typical prior art automated storage and retrieval system 10 with a framework structure 100 was described in the background section above.

The container handling vehicle rail system 108 allows the container handling vehicles 201 to move horizontally between different grid locations, where each grid location is associated with a grid cell 122.

In FIG. 1, the storage grid 104 is shown with a height of eight grid cells 122. It is understood, however, that the storage grid 104 can in principle be of any size. The storage grid 104 can be considerably wider and/or longer than disclosed in FIG. 1. For example, the grid 104 may have a horizontal extent of more than 700×700 storage columns 105. Also, the grid 104 can be considerably deeper than disclosed in FIG. 1. For example, the storage grid 104 may be more than twelve grid cells 122 deep, i.e. in the Z direction indicated in FIG. 1.

Figure 2:
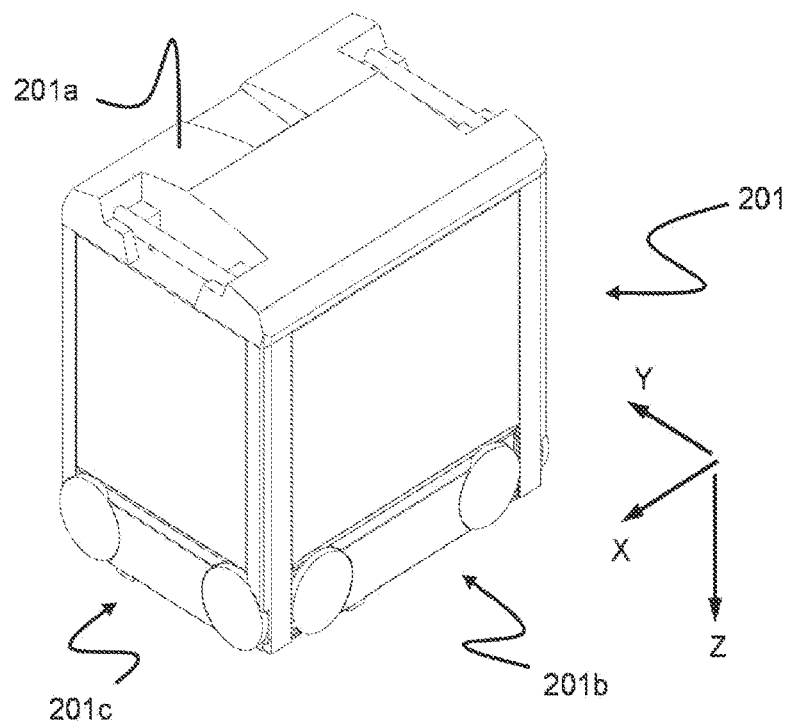
FIG. 2 is a perspective view of a prior art container handling vehicle having a centrally arranged cavity for containing storage containers 106 therein.

FIG. 2 is a perspective view of a prior art container handling vehicle having a centrally arranged cavity for containing storage containers 106 therein.

The central cavity container handling vehicles 201 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference.

Alternatively, the central cavity container handling vehicles 101 may have a footprint which is larger than the lateral area defined by a grid column 112, e.g. as is disclosed in WO2014/090684A1.

Figure 3:
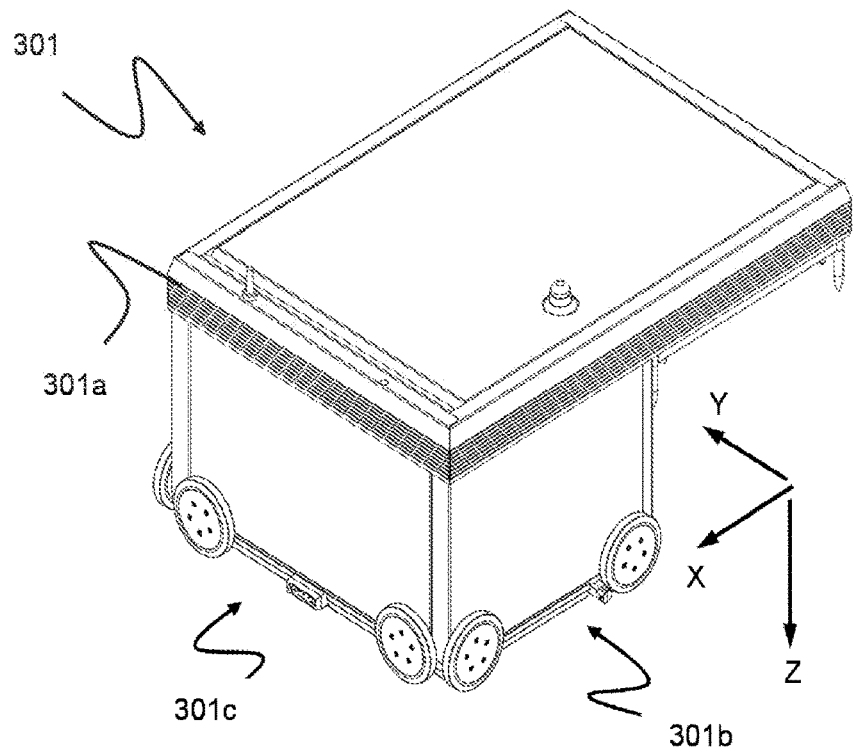
FIG. 3 is a perspective view of a prior art container handling vehicle having a cantilever for containing storage containers 106 underneath.

FIG. 3 is a perspective view of a prior art container handling vehicle having a cantilever for containing storage containers 106 underneath.

Figure 4:
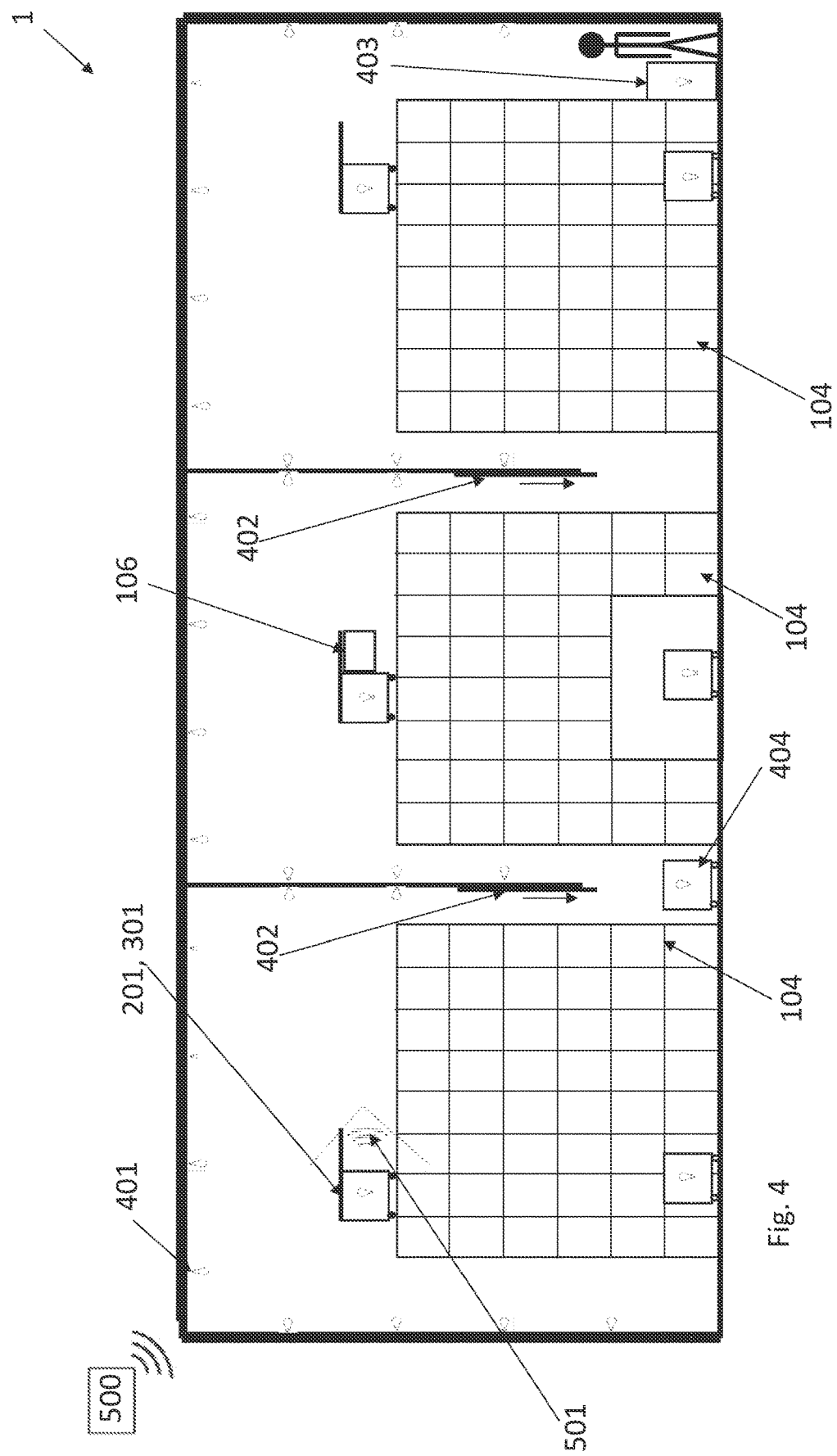
FIG. 4 is a side view of a preferred embodiment of the present invention wherein the communication between transmitters and receivers in the storage system uses light as a medium for communication.

FIG. 4 is a side view of a preferred embodiment of the present invention wherein a central communication system 500 uses light as a medium for communication in the storage system 1.

The storage system 1 is comprised of at least one container handling vehicle 201, 301, 404 for transporting containers 106. These container handling vehicles 201, 301, 404 can be vehicles 201, 301, moving on top of the storage grid 104 lifting containers 106 out of the grid 104, but also remotely operated delivery vehicles 404 for transport of a storage container 106 between the storage grid 104 and e.g. a port 403 for handling of the storage containers 106. The system 1 further comprises a central communication system 500 for communicating information to all parts of the system 1. The system 1 can also comprise at least one port 403 which the containers are transported to and where the relevant articles are picked out of the containers for shipping. After the relevant articles has been picked out, the containers 106 are sent back to a container handling vehicle 201, 301, 404 for transportation back into the storage grid 104. Further, the system 1 may comprise one or more barriers 402 connecting separate sections of the storage grid 104. The system 1 may also comprise other parts.

In a preferred embodiment of the present invention the central communication system 500 communicates information to the different parts of the storage system 1 via a plurality of transmitters 401. These transmitters 401 use light as a medium for communication. The transmitters 401 are positioned around the storage grid 104 in the facilities housing the storage system 1, ensuring that all areas of the storage system 1 are in line of sight of at least one transmitter 401.

The transmitters 401 can be in the form of LED lamps for transmitting information. Cameras can be used for receiving information. However, any other form of equipment for transmitting and receiving information using light as a medium for communication can be used.

In the solution presented in the present invention where light is used as a medium of communication, it is essential that the transmitter 401 and the receiver are in line of sight of each other. In a large storage facility, it may therefore be necessary to use several transmitters 401 and receivers positioned distributed in the facilities housing the storage system 1 in order to cover all the areas of the storage system 1. A container handling vehicle moving either on top of the storage grid 104 or around it will therefore move from one transmitters 401 coverage area to another. This can happen even during communication with the central communication system 500. To ensure that the communication between the central communication system 500 and the container handling vehicle 201, 301, 404 is not interrupted when it is travelling from one transmitter 401 coverage area to another, the central communication system 500 can transmit the same information on all the transmitters 401. The information is transmitted from all transmitters at the same time. This ensures a seamless transfer from one transmitter 401 to another and prevents interference.

In an alternative solution, the system 1 can anticipate the location of the container handling vehicle on the basis of the speed the container handling vehicle is traveling and the knowledge of the current task of the container handling vehicle and the system 1 can hence communicate information via the transmitter and receiver that is closest to the container handling vehicle in question or via the best positioned transmitter and receiver. This allows the central communication system 500 to transmit information to several parts of the storage system 1 at the same time.

If a transmitter 401 is out of order, a certain area of the storage system 1 may be unable to transfer communication signals. In this case, signals can be retransmitted via other container handling vehicles 201, 301, 404 that are in line of sight of the area. A mesh network may be the solution in this scenario. In a mesh network each node is connected to several other nodes in the network, if not all the other nodes of the network. A benefit with this type of networks is that if one of the nodes are incapacitated, rerouting around that node is not a problem. The mesh network is dynamic and will itself find an alternative route.

In an embodiment of the present invention all parts of the system 1, like the container handling vehicles 201, 301, 404 the ports 403, the barriers 402 and similar can both transmit and receive information. This means that all the different parts of the invention can both receive information from the central communication system 500, but also transmit information back to the central communication system 500.

In an alternative solution, this allows for the different parts of the system 1 to communicate directly with each other. Examples of this can be container handling vehicles 201, 301, 404 communicating with each other e.g. to tell the surrounding vehicles that it is either slowing down or speeding up. A container handling vehicle can also retransmit information from the central communication system 500 to e.g. another container handling vehicle that is outside a coverage area. Further a container handling vehicle can communicate with a barrier 402 to tell it to open to allow the container handling vehicle to pass through. This communication where the different parts of the storage system 1 communicates with each other without having to go via the central communication system 500 is called a local communication system 501.

The container handling vehicle has at least one vehicle receiver and one vehicle transmitter. This transmitter and receiver should be placed so that it covers as large an area as possible. A preferred location can therefore be on the top surface of the container handling vehicle. This will cover a large area both above, but also around the vehicle.

In addition to this top transmitter and receiver there can be transmitters and receivers on each side of the container handling vehicle. This increases the chances that the surrounding container handling vehicles 201, 301, 404 will receive the information sent to them. Further the container handling vehicle can communicate different messages at the same time in different directions using the different transmitters and receivers around the body of the container handling vehicle.

If the container handling vehicles 201, 301, 404 top transmitter and receiver is out of order, communication can be directed to the container handling vehicle via neighbouring container handling vehicles 201, 301, 404 relaying the messages via the transmitters and receivers placed on the sides of the body.

If all transmitters and receivers of a container handling vehicle are unable to communicate via light signals, that container handling vehicle automatically manoeuvres to a service station. Alternatively, the container handling vehicles 201, 301, 404 can have a backup communication system. This backup communication system can be Wi-Fi. If the communication system, using light as a medium for communication, for some reason breaks down the Wi-Fi system can take over the communication with the central communication system 500.

In yet another alternative solution the communication between the central communication system 500 and the rest of the storage system 1 can be by using both light and Wi-Fi as communication channels. Light as a medium for communication can be used for communication from the central communication system 500 to the vehicle, ports and barriers and Wi-Fi from the vehicles, ports and barriers to the central communication system 500.

In order to prevent light interference, the storage system 1 can be divided into sections. These sections can be separated by light blocking dividers. These dividers can be curtains, screens or barriers that can be raised or lowered when needed. This makes it possible to separate the communication in one section from the rest of the sections. One such section can be one grid separated from other grids or one part of the grid separated from the rest of the grid. A storage grid can be separated into several such sections.

A benefit with this is that it makes it easier to do maintenance on a container handling vehicle on the grid. Further, these sections can be security zones in case of fire. A further benefit with using light as a means for communication is that it is safer when there is a need for an emergency stop on the entire storage system. Since Wi-Fi is susceptible for interference from signals outside the storage system 1, there is a chance that interference can cause the container handling vehicles to do unintended operations. Using light as a means for communication in a storage system 1 that is blocked off from light interference from the outside, the chance of unintended operations of container handling vehicles is reduced to almost nothing.

Further, by separating the storage grid into sections that can be blocked off from communication from outside the section it makes it easier to ensure that the container handling vehicles in a certain section is shut down, or alternatively that the container handling vehicles in a section is operational while the rest of the storage system 1 is shut down.

The invention claimed is:

1. An automated storage system comprising a three-dimensional storage grid for storing storage containers, at least one container handling vehicle operating on, around or under the storage grid, and a central communication system with a plurality of system transmitters and a plurality of system receivers for controlling and communicating with the at least one container handling vehicle for handling storage containers in the storage grid, wherein said at least one container handling vehicle comprises a vehicle communication system with a vehicle transmitter and a vehicle receiver for communication with the central communication system,
wherein the system and vehicle transmitters and receivers are configured to use light for wireless communication, and wherein the system transmitter and the system receiver are located in the automated storage system on, around, or under the storage grid, transmitting the same information from all the transmitters of the central communication system.

2. The system according to claim 1, wherein the vehicle transmitter and vehicle receiver of the vehicle communication system are located on a top surface of the container handling vehicle.

3. The system according to claim 1, wherein the vehicle communication system comprises more than one vehicle transmitter and more than one vehicle receiver.

4. The system according to claim 2, wherein at least one vehicle transmitter and at least one vehicle receiver are located on each side of the container handling vehicle.

5. The system according to claim 1, wherein the transmitter and receiver of the vehicle communication system is configured to communicate with other container handling vehicles with at least one vehicle communication system with a transmitter and receiver using a local communication system.

6. The system according to claim 1, wherein the vehicle transmitter and vehicle receiver of the vehicle communication system are configured to communicate instructions to open or close a barrier.

7. The system according to claim 3, wherein the vehicle transmitters and vehicle receivers are located on the vehicle for covering all directions above and around the container handling vehicle.

8. The system according to claim 1, wherein said light used for communication is Visible Light Communication (VLC), Li-Fi, Irda, Optical Wireless Communication (OWC) or Reasonable Optical Near Joint Access (RONJA).

9. A method for controlling a container handling vehicle of an automated storage system, wherein the automated storage system comprises a three-dimensional grid for storing storage containers, at least one container handling vehicle operating on, around, or under the storage grid, and a central communication system with a plurality of system transmitters and a plurality of system receivers for controlling and communicating with the at least one container handling vehicle, wherein said container handling vehicle comprises a vehicle communication system with a vehicle transmitter and a vehicle receiver, wherein the method comprises:
transmitting wireless communication signals between the central communication system, and the vehicle communication system of the container handling vehicle using light;
transmitting the same information from all the transmitters of the central communication system; and
controlling operations of the container handling vehicle on, around, or under the storage grid based on at least the wireless communication signals.

10. The method according to claim 9 further comprising:
communicating from the transmitter and receiver of the vehicle communication system to other container handling vehicles with at least one vehicle communication system with a transmitter and receiver, using a local communication system.

* * * * *